INVENTOR.
HEINZ EMIL BADE

INVENTOR.
HEINZ EMIL BADE
BY
J.B. Felshin
ATTORNEY.

INVENTOR.
HEINZ EMIL BADE
BY
J.B.Feldman
ATTORNEY

United States Patent Office 3,396,636
Patented Aug. 13, 1968

3,396,636
COMPRESSED AIR-OPERATED DRIVE-IN APPARATUS TO DRIVE-IN FASTENERS, FOR INSTANCE, NAILS, STAPLES OR THE LIKE
Heinz Emil Bade, Hamburg-Garstedt, Germany (% Joh. Friedrich Behrens, Bogenstrasse 43/45, Ahrensburg, Holstein, Germany)
Filed May 2, 1967, Ser. No. 635,500
Claims priority, application Germany, Jan. 28, 1967, B 90,931
11 Claims. (Cl. 91—399)

ABSTRACT OF THE DISCLOSURE

A compressed air-operated drive-in device for fasteners comprising a cylinder, a piston in the cylinder, a buffer ring at the bottom of the ring having a central opening open to atmosphere, with a check valve for said opening, kept open by a spring, with a reservoir surrounding said cylinder, with compressed air means to move the piston down to seal against the buffer ring, and the cylinder having openings communicating with the reservoir above said piston to allow compressed air to enter the reservoir, and with openings communicating with said reservoir below the piston to allow compressed air from the reservoir to enter the cylinder below the piston and surrounding the seal, to raise the piston in the cylinder and close the check valve and allow the piston to move upwardly in the cylinder.

*Brief summary of the invention*

The invention relates to a compressed air-operated drive-in apparatus to drive-in fasteners such as nails, staples or the like. Such drive-in apparatuses which in practice are also called compressed air-nailing apparatuses, are characterized in that each fastener, for instance, each staple, must be driven in by one single blow. The next blow then already serves to drive in the next fastener which is automatically supplied from a magazine connected with the apparatus, after the first blow has been performed.

For this purpose, the drive-in piston for performing the drive-in blow must be equipped with a considerable kinetic power which practically results in the requirement for a high velocity of the blow. To achieve this high velocity of the blow, the air must be able to flow possibly unobstructedly from that space of the working cylinder which during the drive-in strike remains unbiased, into the open. In connection with compressed air drive-in apparatuses or nailing equipment having the piston thereof returned into the starting position by means of a spring, this requirement is easily met. The tensioning of the return spring during the working stroke of the drive-in piston, however, reduces its power of blow. To overcome this drawback, it has already been proposed to introduce the air displaced by the piston during the blowing stroke, into a reservoir and compress it there in order to make use of the air so compressed in the return of the drive-in piston to its starting position upon completion of the drive-in stroke. The effort of compressing to be spent in this operation during this operation, however, reduces the power of the blow of the drive-in piston in a manner similar to that in which, in apparatuses using a spring to return the piston into its starting position, the effort necessary for the tensioning of the spring reduces it.

The invention relates to a compressed air-operated drive-in apparatus to drive-in fasteners, such as nails, staples or the like, comprising a working cylinder for the accommodation of a reciprocable drive-in piston, the one side of said cylinder (working space) being adapted to be biased with compressed air for effecting a drive-in stroke of the piston, and the other side of which (return space) being adapted to be biased with compressed air from a reservoir for the return movement of the drive-in piston into its starting position, said reservoir compressed air having been derived from the working space on completion of the drive-in stroke from the source.

The invention is concerned with the problem of improving an apparatus of the type described above in such a manner that the reservoir is filled with a sufficient amount of compressed air from the working space of the cylinder on completion of the drive-in stroke, and to effect this filling of the reservoir in such a manner that the drive-in stroke is not obstructed by the compression of air and thus the power of blow of the drive-in piston is not reduced. In the sense of the invention, the air in the reservoir is sufficiently compressed when the pressure level of the compressed air present in the reservoir on completion of the drive-in stroke suffices to return the working piston safely and quickly into its starting position on completion of the working and drive-in stroke.

According to the invention, the problem is solved in that the air return chamber is in communication with the atmospheric air via a spring-biased check valve (main relief valve) supported at the working cylinder and opening towards its return air space, and in that the drive-in piston at the end of its working stroke on the one hand exposes at least one opening (reservoir filling opening) and that on the other hand the spring of the main relief valve is dimensioned so that said spring keeps the main valve continuously open to the atmosphere. After reversal of the piston for return, the main relief valve is brought into closing position by the compressed air pressure of the replenished reservoir against its spring. In this manner, the air displaced by the drive-in piston during the drive-in stroke discharges unobstructedly through the amply dimensioned main relief valve. In the lower dead center of the drive-in piston in which it has already exerted its power of blow on the fastener, the piston on the one hand opens the reservoir filling opening and on the other hand blocks the reservoir towards the atmosphere by abutment of the piston against the buffer. The compressed air present in the working space, now, from the source of compressed air all at once still fills the reservoir with compressed air. The piston on completion of its drive-in stroke will be situated on the limiting member 49 and blocks the discharge of compressed air to the atmosphere via the main relief valve. The main relief valve thus remains open for a sufficient period of time for the drive-in piston to contact the buffer. The drive-in piston, now, upon pressure relief by the reversal of the compressed air, is again driven upwardly by the return stroke of the compressed air, whereby immediately upon initiation of the return stroke the compressed air present in the reservoir arrives underneath the piston, closes the main relief valve and now moves the piston upwardly. The compressed air in the reservoir which is about to drain via the blocking device suddenly opened by the working piston just having begun its return stroke, however, now impinges on the main relief valve and presses it quickly onto its seat against its spring so that the compressed air in the return space of the working cylinder remains captive and is capable of bearing on the drive-in piston in a direction of movement towards the starting position as long as the force of the compressed air effective on the main relief valve in a closing sense is capable of overcoming the force of the spring loading the main blocking valve. At the end of the return stroke of the working piston the pressure of the compressed air in the return space will have become so low by expansion of the air that the spring of the main relief valve again opens and the drive-in apparatus is prepared to perform the next driving stroke.

Suitably, the reservoir filling opening is released about the same moment in which the drive-in piston closes the shut-off device arranged between the reservoir filling opening and the main relief valve. But it may also be to the purpose either to open the reservoir filling opening at a moment somewhat earlier than the shut-off device is closed because then the air still available beneath the piston may freely escape into the atmosphere.

When carrying the invention into practice, it will be recommendable to provide a series of reservoir filling openings circumferentially spaced on the periphery of the working cylinder rather than only one such reservoir filling opening. In addition, it may also prove to be an advantage under certain circumstances to provide at least one relief channel connecting the return space with the working space of the cylinder near the upper dead center position of the drive-in piston. The working space must, of course, be relieved during the return movement of the drive-in piston. If, thus, at the end of the return movement of the drive-in piston some residual pressure should still be left in the return space, this residual pressure may reach the open air via the piston through the outlet opening.

Furthermore, it is recommended in accordance with the invention to provide at least one more opening disposed beyond the stroke of the drive-in piston between the reservoir and the shut-off device, said additional opening, contrary to the reservoir filling opening already mentioned above, is designated as a control opening and should be considerably larger than the reservoir filling opening. The reservoir filling opening, according to its purpose, must be relatively small particularly in its axial extension and may also be provided with a check valve in a manner known per se and establish connection between the reservoir and the pressure-biased working space possibly near the lower dead center position of the drive-in piston. On completion of the drive-in step, the working space of the cylinder will be closed towards the source of compressed air by means of a control means not described in any more detail. The working space now is in communication with the atmosphere into which the used-up compressed air expands. The compressed air which becomes now effective under the piston from the reservoir, now urges the main relief valve into its closing position. The advantage of a check valve at the control opening would reside in that the full pressure of the compressed air present in the reservoir would be available for closing the main relief valve at the moment the piston during its return movement passes the reservoir filling opening or the check valve, the main relief valve will already be closed, so that the entire amount of compressed air now enclosed in the reservoir may effect the return movement of the working piston by exansion. Suitably, in this arrangement, the over-all cross sectional area of the control opening or control openings is greater than the overall cross sectional area of the reservoir filling opening or the reservoir filling openings.

It is furthermore recommendable to arrange the main relief valve in the central discharge opening of a buffer member disposed in the lower end of the working cylinder and to urge it against abutment webs provided in the discharge opening by means of a spring. The buffer member is suitably made of an elastomeric and especially robust synthetic material, in particular synthetic caoutchouc or polyurethane. This buffer member thus serves on the one hand to form a seat for the main relief valve and, on the other hand, by its end face facing the piston, serves to form the shut-off valve which at the same time forms a sealing between the main relief valve and the reservoir filling opening.

With a preferred embodiment of the invention, finally, the sealing of the drive-in piston is arranged between the reservoir opening and the control opening.

Other objects of this invention will in part be obvious and in part hereinafter pointed out.

The invention accordingly consists in the features of construction, combinations of elements, and arrangements of parts, which will be exemplified in the construction hereinafter described, and of which the scope of invention will be indicated in the following claims.

*Brief description of the several views of the drawing*

In the accompanying drawing, in which is shown an illustrative embodiment of this invention.

Figure 1:
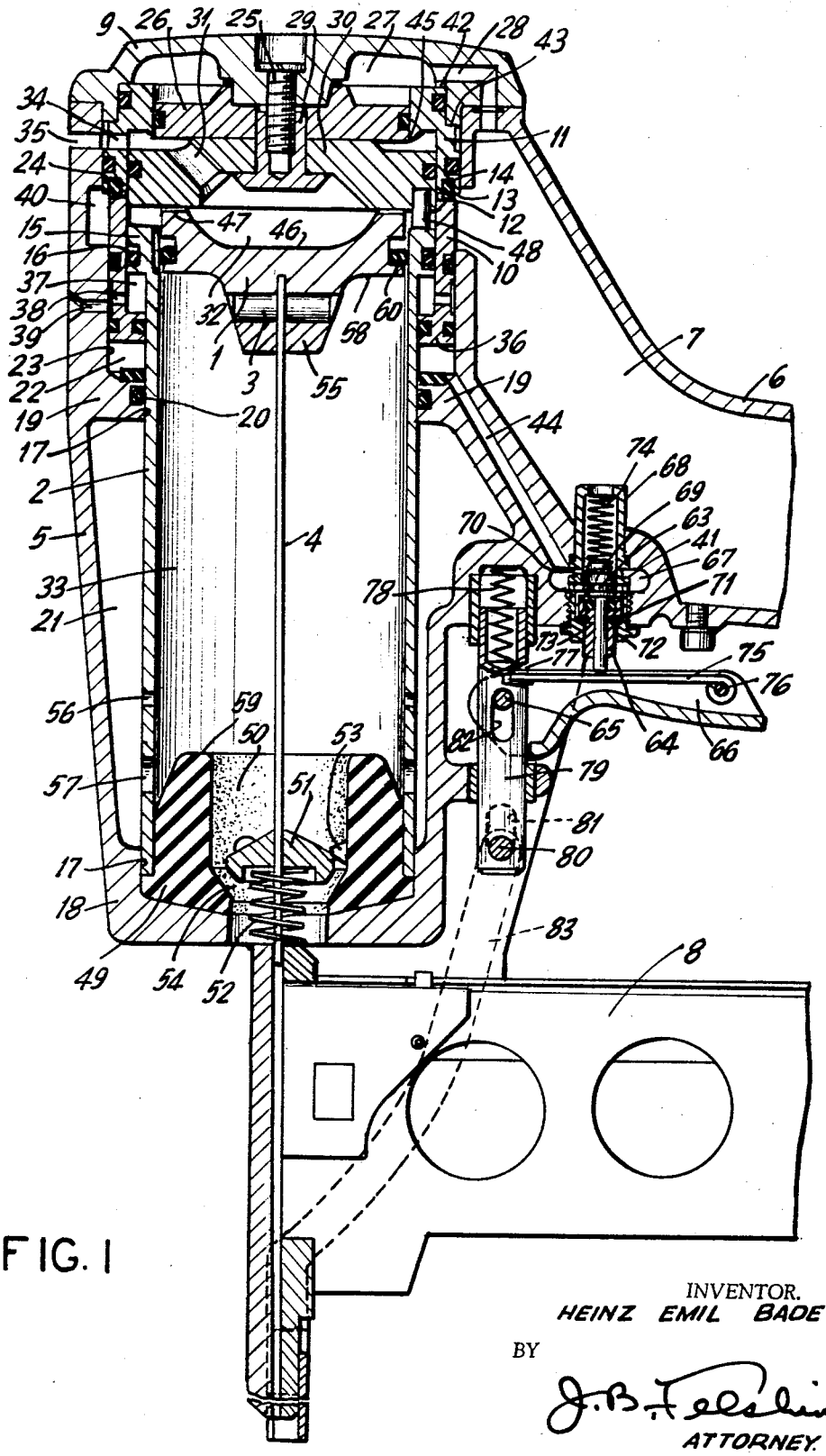
FIG. 1 shows a longitudinal sectional view of the drive-in apparatus in accordance with the invention with the drive-in piston in its starting position.

In the FIGS. 1–4, the parts which are not essential to the invention are shown partly broken away, namely the handle for the compressed air connection and the supply device for the fasteners to be driven-in.

*Detailed description of the invention*

The drive-in piston 1 is movable to and fro in a working cylinder 2. A drive-in slide blade or plunger 4 is supported at the piston by means of a piston bolt 3.

The cylinder 2 is arranged in a housing 5 provided with an extension 6 serving as a handle, the interior 7 of said extension serving as a channel for the supply of the compressed air. To this channel a compressed air supply line is connected in a manner not shown in more detail. The supply device of the fastener is designated with 8 and is fastened at the lower end of the housing 5 in a manner not shown in more detail.

The interior of the housing 5 is enclosed by a cover 9 which is removably fastened at the housing by means of screws not shown in more detail.

Essentially two slides 10, 11 are serving to control the compressed air for the operation of the drive-in piston 1, said slides having a circular cross sectional area, the slide 10 of which is designated as a supply slide and the slide 11 as a discharge slide. Both slides 10 and 11 are separated from each other by radial surfaces 12, 13. The radial surface 13 forming part of the discharge control slide 11 has recessed therein an annular seal 14 adapted to lie sealingly against the radial surface 12 of the supply control slide. Prior to enlarging on the control of these slides 10, 11 in detail, the arrangement and fastening of the working cylinder 2 in the housing 5 and the cover 9 will now be described in more detail.

The working cylinder is provided with an annular collar or flange 15 which is displaceably supported in the bore of the supply control slide 10 utilizing a sealing 16. The housing 5 comprises bores of different diameters which are disposed centrally with respect to the axis of the cylinder 2 and the piston 1. The bore 17 of small diameter is provided in the bottom 18 and an intermediate wall 19 of the housing 5. This bore serves to receive the cylinder 2, thus essentially corresponds to the outer periphery of the cylinder. A sealing 20 is inserted in the bore 17 of the intermediate wall. This sealing closes a pilot control space 22 disposed above said sealing, from a reservoir 21, both spaces (22, 21) annularly surrounding the cylinder 2.

In the second bore 23 which has a slightly greater diameter there is arranged for displacement the outer periphery of the supply control slide 10. The third bore 24 which is again of an increased diameter, displaceably accommodates the outer periphery of the discharge control slide 11.

At the cover 9 there are centrally fastened by means of a screw 25 and a screw insert 29, an intermediate disc 26 and a valve seat 30 in such a manner that an annular space 27 is formed between this intermediate disc 26 and the cover 9, said annular space being termed a main control space and constantly communicating with the channel 7 via a channel 28 which is filled with compressed air when the apparatus is connected to the compressed air line (not shown). The valve seat disc 30 is provided with an essentially radially extending channel 31 connecting the working space 32 of the cylinder 2 above the piston 1 with passage openings or windows 34 provided in the discharge control slide 11 and communicating with the outer atmosphere via openings 35 provided in the housing 5. The lower edge of the supply control slide 10 is provided with a flange or a collar 36, which is displaceably and sealingly guided on the outer periphery of the cylinder 2 such that the collar or flange 36 closes the pilot control space 22 already mentioned above. The annular space 37 which is formed above said collar 36 and below the cylinder collar 15 communicates with the outer atmosphere via channels 38 provided in the supply control slide 10 and a bore provided in the housing 39 which in addition serves to supply oil. As will be seen from all the FIGURES 1–4, radial edge 12 of the supply control slide 10 and the radial edge 13 of the discharge control slide 11 lie adjacent an annular space 40 provided in the housing 5 which is constantly in communication with the compressed air reservoir 7 of the apparatus.

A manually controllable valve 41 is connected with the pilot control or release space 22 via a channel 44 provided between the reservoir 21 and the compressed air reservoir 7. In the example of embodiment, the valve 41 consists essentially of two valve stems or spools 63, 64 concentrically nested one within the other which are both operated by means of a manually operated main release lever rotatably mounted about an axis 65 supported in the housing 5. The pilot control space 22 is in communication with a control valve space 67 provided in the housing 5 via a channel 44, said space 67 being adapted to be alternatively biased with compressed air from the compressed air reservoir or connected to the atmosphere, respectively, by means of the valve 41.

For this purpose, the control valve space 67 is in communication with the compressed air reservoir 68 via a cylinder sleeve, in the bore of which the piston 69 of the inner valve ram 63 displaceably merges, which is provided with a sealing ring. The piston 69 controls openings or windows 70 which are provided in the cylinder sleeve 68 in the region of the control valve space 67.

The inner valve ram 63 is tightly and axially displaceably supported in the bushing-like hollow outer valve ram, which is effective as a valve member provided with a valve sealing and in this capacity cooperates with a valve seat 71 controlling a preferably annular channel 72 communicating the control valve space with the atmosphere. The channel 72 including the valve seat 71 is provided in a threaded bushing 73 which is tightly screwed into a threaded bore of the housing 5.

The ram 63 is retained in the open position by means of a spring 74 and by the pressure of the compressed air, in which open position the control opening 70 is in communication with the compressed air reservoir 7. In this arrangement, the compressed air presses the ram-like outer valve member 64 onto its seat 71 so that the control valve space 67 is shut-off from the atmosphere (see FIG. 1).

When actuating the valve 71 by means of the main release lever 66 and an auxiliary release lever 75, to be described in more detail in the following, which is rotatably supported on the main release lever, the inner valve ram 63 is moved upwardly at first against the force of the spring 74 and finally against the pressure of the compressed air, whereby the connection of the control valve space 67 with the compressed air space 7 is interrupted.

Shortly thereafter, the outer valve ram or member 64 is lifted from its seat 71 and thereby the control valve space 67 is connected with the atmosphere.

The auxiliary release lever 75 is supported in the main release lever 66 by means of a journal 76 and by its free end engages within the eccentric transverse groove 77 of a bolt 79 which is supported in the housing 5 for axial displacement against the force of a spring 78 and comprises a longitudinal groove 82 through which the bearing journal 65 of the main release lever extends. At the lower end of the bolt 79 there is arranged a safety bracket 83 via a journal 80 movably guided in the direction of the axis of the bolt 79 in longitudinal grooves 81 arranged at the housing, said bracket 83 likewise displaceably guided in the housing in the said direction.

Figure 2:
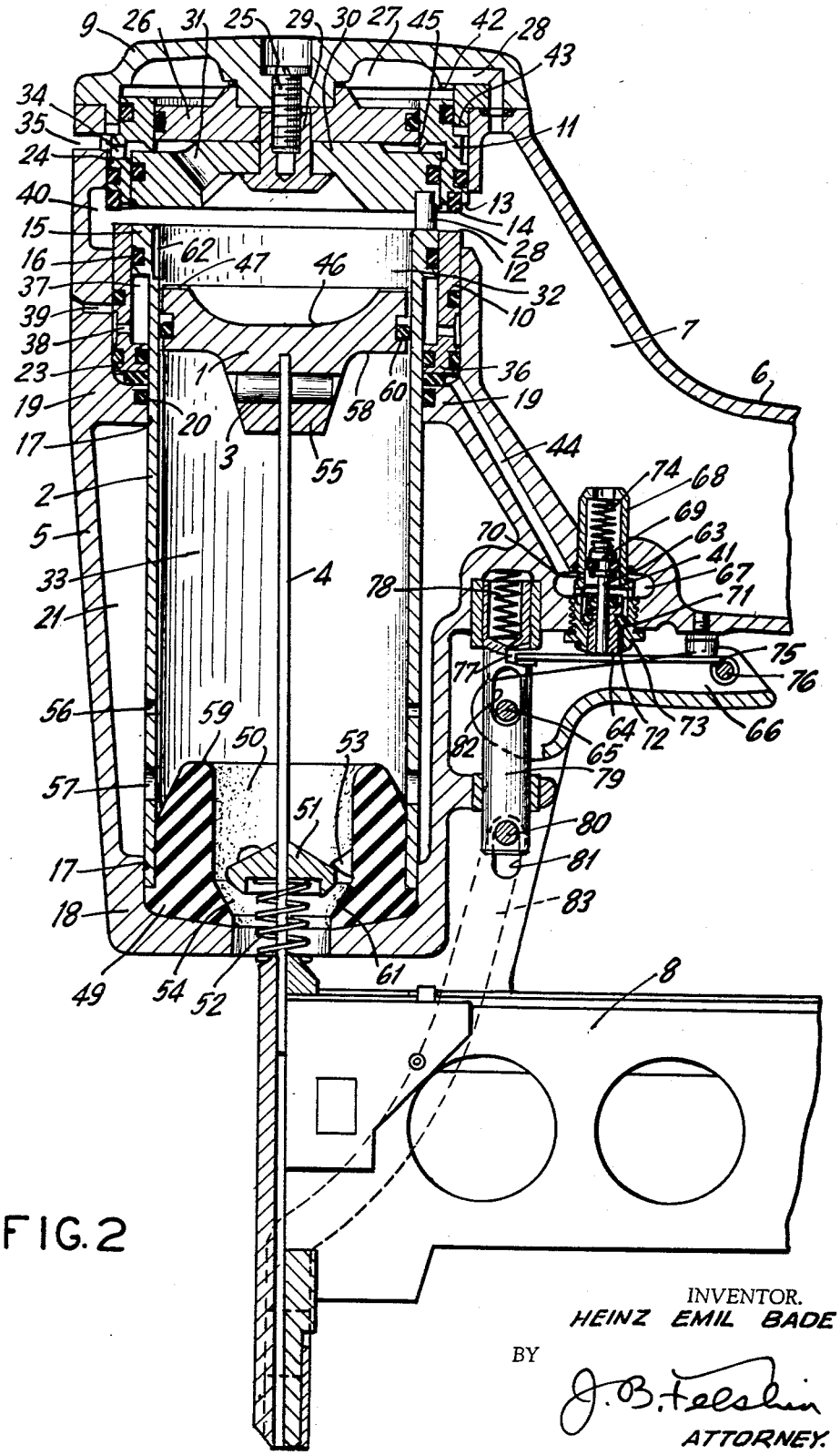
FIG. 2 shows the drive-in apparatus of FIG. 1 shortly after the commencement of the pressure stroke of the drive-in piston.

When placing the apparatus on the surface of a workpiece, a safety bracket is pushed from the position shown in FIG. 1, into the position shown in FIG. 2 whereby the bolt 79 is likewise moved upwardly against the effect of the spring 78. The bolt 79 in this operation takes along with it the auxiliary release lever 75 which at first moves the inner ram 63 upwardly, the auxiliary release lever 75 in this operation taking abutment of the main release lever 66 via its journal 76 (the main release lever in its position of rest is shown in FIG. 1 taking abutment against a stop not shown). Hereby, the connection of the control valve space 67 with the compressed air space 66 is interrupted. If shortly thereupon the main release lever 66 is pivoted counter-clockwise about its own axis 65 by an upwardly directed pressure, then the inner valve member 64 will be lifted from its seat 71 and thereby the control valve space 67 will be connected with the atmosphere.

In this position as shown in FIG. 1, the pilot control space 22 is in communication with the compressed air reservoir 7 via the manually operable valve 41. The main control space 27 is likewise subjected to the same pressure because it is in connection with the same compressed air reservoir via the channel 28. The annular cross sectional area of the pilot control space 22 is larger than the annular cross sectional area of that part of the drain control slide 11 dipping into the main control space 27, so that the two slides 10 and 11 are in their upper position as shown in FIG. 1. The drain control slide 11 in this arrangement lies close against the two abutment surfaces 42 and 43 of the cover 9. It is retained in this position by the pressure of the compressed air in the compressed air reservoir 7 becoming effective via the valve 41 through the channel 44 and the space 22 to exert a force on that annular surface of the supply flow control slide by which said supply control slide 10 is larger than the outlet slide 11.

As soon as the pilot control space 22 is connected with the outer atmosphere through the channel 44 by means of the manually controllable valve 41, i.e. is relieved from pressure, the two slides 10 and 11 are moving downwardly into the position as shown in FIG. 2 under the influence of the pressure which is effective on the upper annular surface of the outlet control slide 11 from the main control space 27. Shortly thereafter, the outlet control slide 11 abuts on the valve seat disc 30 by an annular surface 45 provided on said outlet control slide 11 in the manner of a valve thus interrupting thereby the connection between the working space 32 and the outer atmosphere.

The small annular surface by which the radial surface 12 of the supply flow control slide 10 extends about the sealing 14, now suffices to remove the supply flow control slide 10 from the sealing surface 13 thus establishing the communication between the compressed air reservoir 7 and the annular compressed air reservoir 40 with the working chamber 32 of the cylinder. The end face of the piston 1 is provided with radial grooves 47 and with a pan-shaped recess 46. The compressed air flows into this space so that now the working piston performs its beating or drive-in stroke.

The cylinder 2 is pushed into the bore 17 of the housing and retained by means of the lid 9 with the interposition of the intermediate disc 26 and the valve seating disc 30, spacers 48 being inserted between the valve seating disc 30 and the flange 15 of the cylinder 2, said spacers 48 maintaining window-like openings between the lower surface of the valve seating disc 30 and the upwardly facing end face of the cylinder flange 15. Sealing rings are inserted between the individual chambers and channels which are adapted to be subjected to various pressures and which are shown in a schematic representation but not described in any more detail. A buffer ring 49 of relatively large cross sectional area is inserted at the bottom of the cylinder which is provided with a cylindrical passage opening 50. A valve member 51 is arranged in this passage opening 50, said valve member surrounding the drive-in slide and being pressed by means of a coil spring or conical spring 52 against at least three projections 53 equidistantly spaced on the periphery and extending inwardly from the passage bore 50. The biased spring 52 abuts on the one hand against a valve member and, on the other had against the tool to guide the driver 4, in the example of embodiment the magazine device 8 for the supply of the fastener.

In the position as shown in FIG. 1, the main relief valve 51 is in the open position leaving an annular channel 54 of a sufficient cross sectional area for the outflow of the air which is displaced during the drive-in stroke of the piston 1.

FIG. 2 shows the drive-in piston 1 during its drive-in stroke. The main release valve 51 is fully opened. In the reservoir 21 which is in communication with the return space 33 of the working cylinder via openings 56 and 57, atmospheric pressure is prevailing.

Figure 3:
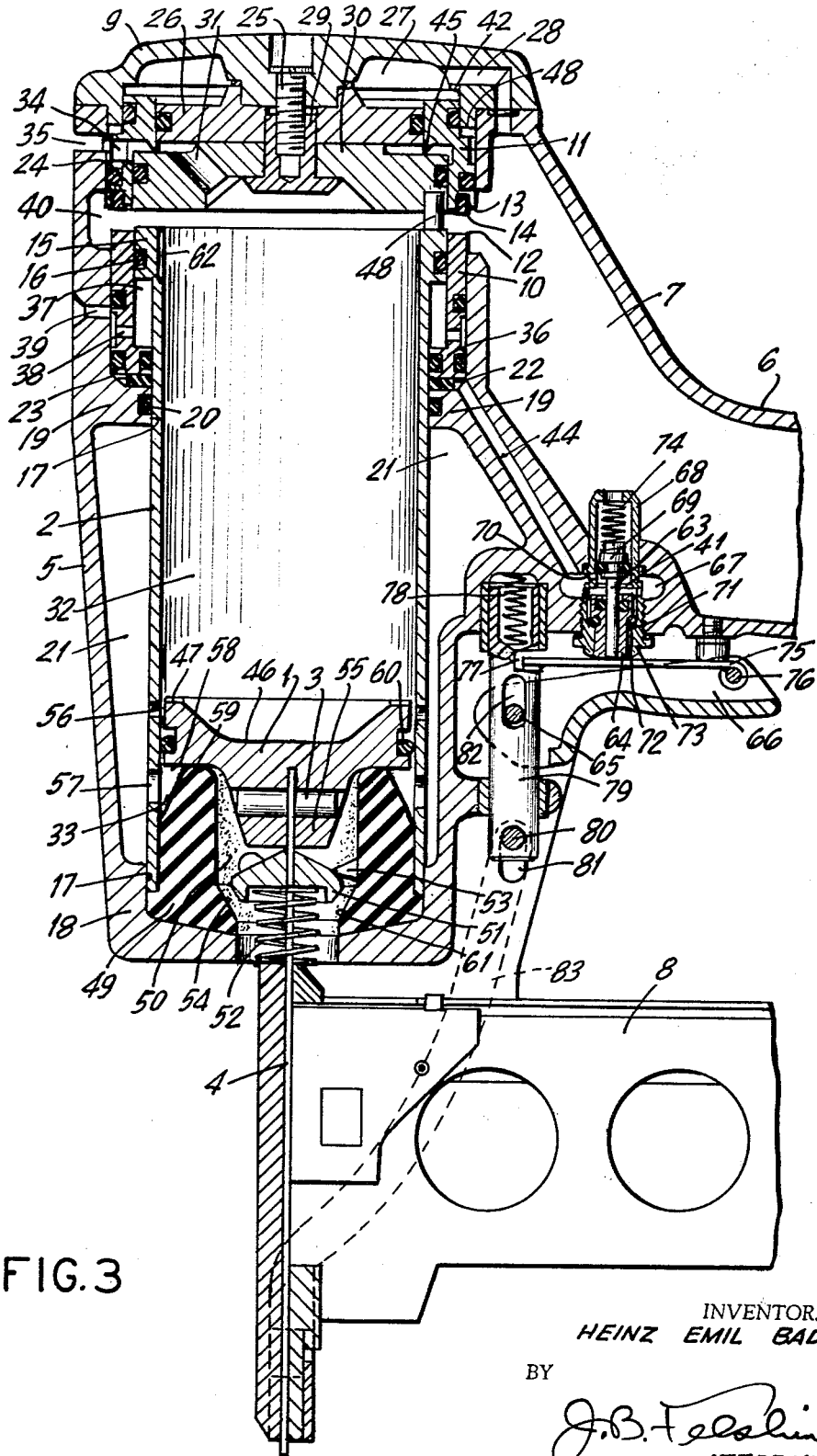
FIG. 3 shows the drive-in apparatus of FIGS. 1 and 2, with the drive-in piston in its lower dead center position after completion of the drive-in stroke.

FIG. 3 shows the drive-in piston in a position near its lower dead center. The openings 56 in this position of the piston 1 establish a communication of the reservoir 21 with the working chamber 32, so that now the partially expanded compressed air present in the working space fills the reservoir 21. The lower surface 58 of the dish-shaped piston is effective as a valve member area and lies sealingly against the area 59 of the buffer insert 49 which has the effect of a valve seat. The openings 57 lie outside the area of the stroke of the piston 1 so that the piston seal 60 is placed between the reservoir filling opening 56 and the openings 57 which will also be designated as control openings for reasons to be explained in the following. Both the openings 56 and the openings 57 are equidistantly spaced on the periphery of the cylinder 2, the passage cross sectional area of the openings 57, however, being preferably essentially greater than that of the openings 56. The shut-off valve consisting of the piston 1 and the buffer member 49 remains tightly closed.

The compressed air present in the reservoir 21 is trapped by the sliding operation between the end face of the piston and the buffer 59. Because of the pressure release of the piston 1 by means of the manually operated valve 41, now, the compressed air from the reservoir 21 becomes effective on the under-surface of the piston and biases at the same time the valve member 51 which moves to abut against the sealing surface 61 thus preventing the air to escape from the reservoir into the open. Thus, a safe return of the piston into its starting position is guaranteed.

At the beginning of the return stroke, the sealing 60 of the piston 1 leads over the reservoir filling openings so that the return space 33 below the piston 1 is biased with the compressed air stemming from the reservoir 21. The compressed air is trapped in the reservoir 21 and the return space 33 because the main release valve 51 remains furthermore closed under the effect of the pressure of this already partially expanded compressed air. The piston 1 under the effect of this pressure is rapidly moved upwardly, and the compressed air trapped in the return space 33 in this operation expands to an extent sufficient to open at the end of this return stroke of the drive-in piston 1, the valve member 51 of the main release valve by the effect of the biased spring 52.

Figure 4:
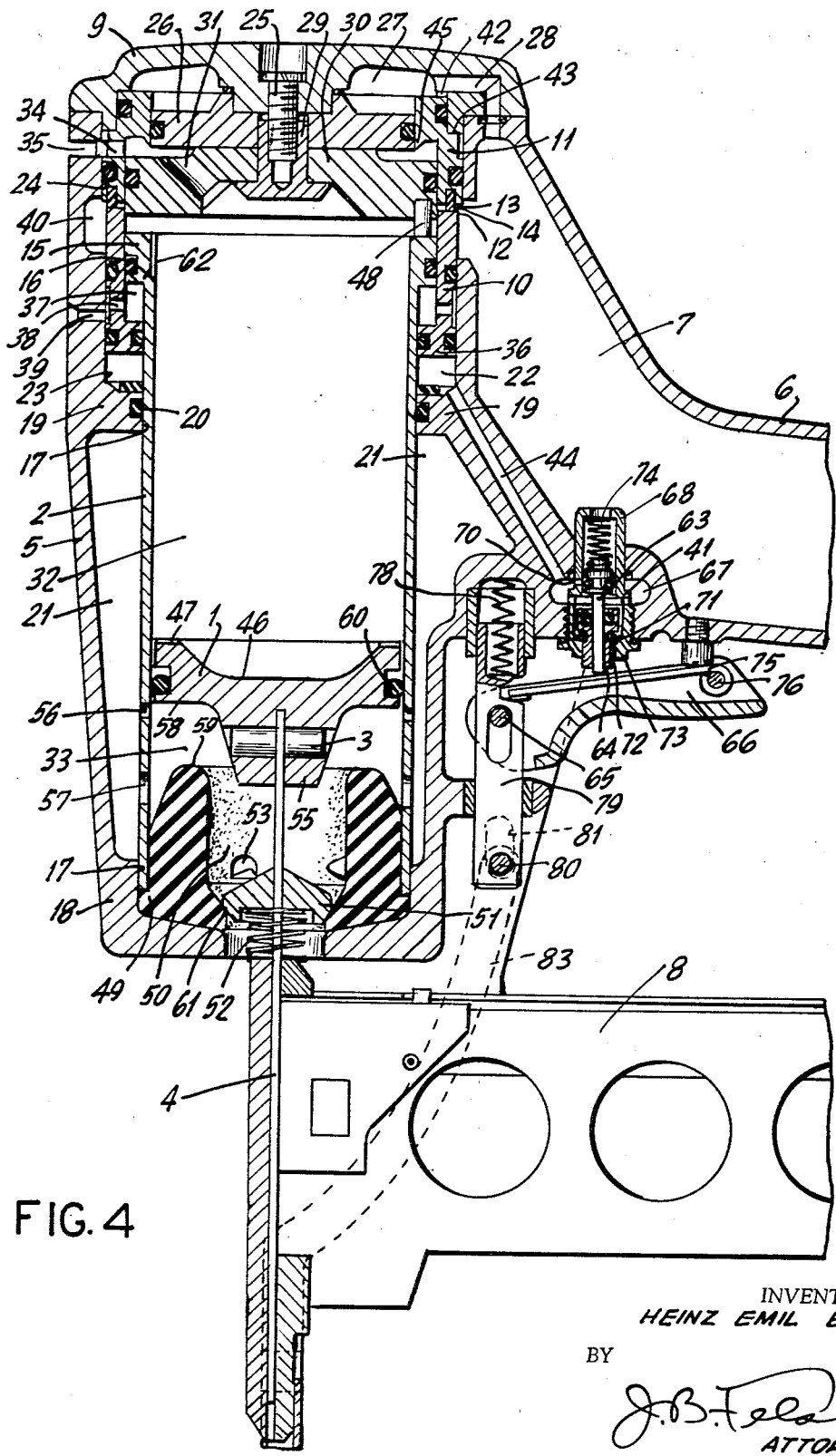
FIG. 4 shows the drive-in apparatus of FIGS. 1–3, with the drive-in piston in a position midway on its return stroke.

FIG. 4 shows the drive-in piston at the beginning of its return stroke.

In case the valve member 51 of the main release valve, at the end of the return stroke, still should not have opened, release channels 62 are provided in the upper portion of the cylinder 2 which in the upper dead center of the drive-in piston connect the working chamber 32 of said drive-in piston with the return space 33. At this moment, the working space 32 is again in communication with the outer atmosphere via the opened valve edge 45 of the outflow control slide 11, as will be seen from FIG. 4. This results from the fact that when releasing the manually controlled valve 41 the pilot control chamber 22 is again filled with compressed air. The supply flow control slide 10 is thereby pressed against the sealing 13 of the outflow control slide 11 and the connection of the working chamber 32 with the compressed air chamber 7, 40 is interrupted. Immediately subsequent thereto, the outflow control valve 11 is also opened, the valve edge 45 lifting from the seat disc 30 and in this manner connecting the working chamber 32 with the outer atmosphere, thus being relieved from pressure.

What is essential to the invention is the control of the outflow of the air on the return side 33 of the piston 1. The control of the compressed air for biasing the working chamber 32 of the cylinder, however, is not decisively significant for the invention. In the example of embodiment, for this purpose, the outflow control slide 11 and the supply flow control slide 10 are provided, which are controlled by the pressure release of the pilot control chamber 22 and by constant bias with compressed air of the main control chamber 27. The special advantage of the control described consists in that for the purpose of initiating the working stroke of the piston 1, at first the working chamber 32 is separated from the atmosphere by means of the valve edge 45 and is connected with the compressed air reservoir, only thereafter, but then, all of a sudden and over the entire peripheral cross sectionl area of the supply flow control slide 10. At the end of the return stroke, an irreproachable pressure relief of the return chamber 33 will result via the relief channels 62, the grooves 47 and the transfer channel 31 to the atmosphere. But instead of this, it is also possible to guide the compressed air to the working chamber of the cylinder by direct control.

Besides, it is also possible to retain the piston still for a short time interval after the working chamber has been biased with compressed air for instance, by means of a permanent magnet, in order to increase the accelerating power effective on the drive-in piston.

It will thus be seen that there is provided an article in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative only.

I claim:

1. Compressed air-operated drive-in apparatus to drive in fasteners, comprising a casing, a cylinder in said casing, a piston in said cylinder movable relative thereto downwardly for a drive-in stroke and upwardly for a return stroke, a drive-in plunger attached to said piston, means to supply compressed air to the cylinder above said piston to move the piston downwardly for a drive-in stroke, means to provide an opening at the lower end of said cylinder open to atmosphere during the drive-in stroke, and also a valve seat surrounding said opening, valve means to close said opening, means to bias said valve means to open position, a reservoir chamber in said casing, first passage means connecting the interior of said cylinder above said piston with said reservoir when said piston is in its downmost position, second passage means in said cylinder connecting the reservoir to the interior of said cylinder below said piston when said piston is in its downward position, and means at the bottom of said cylinder adapted to be contacted by said piston when said piston is in its downmost position, to seal a portion of the interior of the cylinder below said piston when it is in its downmost position, which portion communicates with said second passage means, from said opening whereby during the drive in stroke of the piston, air below said piston will exhaust to atmospere through said opening, and when said piston is in its downward position, compressed air in the cylinder and above the piston will pass through said first passage means to said reservoir and whereby air under pressure will pass through said second passage means from said reservoir to said portion of said cylinder below said piston, to raise said piston and break said seal and allow air under pressure to pass to said valve means and cause said valve means to seat on said valve seat against said biasing means.

2. The combination of claim 1, said provide means comprising a buffer ring at the lower end of said cylinder, said buffer ring being formed with said valve seat.

3. The combination of claim 2, said buffer ring comprising means at the bottom of said cylinder contacted by said piston in its downmost position, to seal said portion of said cylinder.

4. The combination of claim 3, said plunger passing through said buffer ring, said valve means comprising a valve member slidably mounted on said plunger.

5. The combination of claim 3, said biasing means comprising a spring engaging the underside of said valve member and pressing said valve member upwardly.

6. The combination of claim 5, and means on said buffer ring to limit upward movement of said valve member.

7. The combination of claim 1, and means to slidingly seal said piston to the inner surface of said cylinder.

8. The combination of claim 1, in combination with restricted passage means to allow compressed air to pass from the cylinder and below the piston, to a space above said piston, when said piston is adjacent its uppermost position.

9. The combination of claim 8, means to connect the space above the piston to atmosphere, and valve means to close the space above said piston from atmosphere.

10. The combination of claim 1, the overall cross-sectional area of said second passage means being greater than the overall cross-sectional area of said first passage means.

11. The combination of claim 1, said opening being formed centrally in a buffer ring at the lower end of said cylinder and said valve means comprising a valve member, abutment means on said buffer ring, and said biasing means pressing said valve member against said abutment means to retain said opening in open condition.

References Cited

UNITED STATES PATENTS

| | | | |
|---|---|---|---|
| 2,983,922 | 5/1961 | Juilfs | 91—399 |
| 3,188,921 | 6/1965 | Bade | 91—399 |
| 3,205,787 | 9/1965 | Volkmann | 91—399 |
| 3,320,860 | 5/1967 | Bade | 91—461 |

PAUL E. MASLOUSKY, *Primary Examiner.*